(12) United States Patent
Zhang

(10) Patent No.: US 12,279,539 B1
(45) Date of Patent: Apr. 22, 2025

(54) ROLLING LAWN AERATOR

(71) Applicant: Kun Zhang, Guangdong (CN)

(72) Inventor: Kun Zhang, Guangdong (CN)

( * ) Notice: Subject to any disclaimer, the term of this patent is extended or adjusted under 35 U.S.C. 154(b) by 0 days.

(21) Appl. No.: 18/765,544

(22) Filed: Jul. 8, 2024

(51) Int. Cl.
*A01B 1/24* (2006.01)

(52) U.S. Cl.
CPC ................... *A01B 1/243* (2013.01)

(58) Field of Classification Search
CPC ........................................ A01B 1/243
USPC ..................................... 172/21, 22
See application file for complete search history.

(56) References Cited

U.S. PATENT DOCUMENTS

| | | | | |
|---|---|---|---|---|
| 2,543,888 A * | 3/1951 | Bunch | ................. | A01C 21/002 |
| | | | | 111/91 |
| 2,591,572 A * | 4/1952 | Mascaro | ................ | A01B 45/02 |
| | | | | 172/547 |
| 2,601,591 A * | 6/1952 | Colombo | ............... | A01B 29/04 |
| | | | | 172/546 |
| 2,700,926 A * | 2/1955 | Goit | ....................... | A01B 45/02 |
| | | | | 172/551 |
| 3,797,577 A * | 3/1974 | Killion | ................. | A01B 45/023 |
| | | | | 172/96 |
| 3,934,390 A * | 1/1976 | Ballard | .................... | E01H 1/106 |
| | | | | 172/547 |
| 4,148,362 A * | 4/1979 | Orth | ....................... | A01B 45/02 |
| | | | | 172/112 |
| 4,723,607 A * | 2/1988 | Hansen | .................. | A01B 45/02 |
| | | | | 172/554 |
| 6,691,791 B2 * | 2/2004 | Bjorge | ................. | A01B 45/026 |
| | | | | 172/1 |
| 6,766,865 B1 * | 7/2004 | Dagel | .................... | G01N 33/24 |
| | | | | 172/457 |
| 6,863,133 B2 * | 3/2005 | Graf | ..................... | A01B 45/026 |
| | | | | 172/79 |
| 2011/0290511 A1 * | 12/2011 | Nahass | .................. | A01B 45/02 |
| | | | | 172/21 |

FOREIGN PATENT DOCUMENTS

FR          2215160 A  *  9/1974  ............. A01B 45/02

* cited by examiner

*Primary Examiner* — Gary S Hartmann
(74) *Attorney, Agent, or Firm* — Justin Lampel

(57) ABSTRACT

The present application discloses a rolling lawn aerator, including a perforating device, where the perforating device is capable of rolling on a lawn so as to perforate and aerate the lawn. The perforating device includes a body assembly and a plurality of perforating assemblies, and the plurality of perforating assemblies are arranged in a circumferential direction of the body assembly; and each of the perforating assemblies includes a perforating pipe, and at least a part of a structure of the perforating pipe exceeds the body assembly in a radial direction of the body assembly.

19 Claims, 9 Drawing Sheets

ROLLING LAWN AERATOR

FIELD OF TECHNOLOGY

The present application belongs to the technical field of lawn maintenance, and particularly relates to a rolling lawn aerator.

BACKGROUND

After being used for a period of time, a turf bed of a lawn may become solid and hard due to watering and treading, resulting in soil hardening, which may reduce the aeration and water permeability of soil and affect normal growth of the lawn.

SUMMARY

In view of above conditions, it is necessary to provide a rolling lawn aerator, which can perforate and aerate soil under a lawn and create a good growth environment for the lawn.

An embodiment of the present application provides the rolling lawn aerator, comprising a perforating device, where the perforating device is capable of rolling on the lawn so as to perforate and aerate the soil under the lawn. The perforating device comprises a body assembly and a plurality of perforating assemblies, and the plurality of perforating assemblies are arranged in a circumferential direction of the body assembly. Each perforating assembly comprises a perforating pipe and a limiting member. Each perforating pipe is rotationally connected to the body assembly, and under the condition of no external force, an extension direction of the perforating pipe does not coincide with a radial direction of the body assembly. Each limiting member comprises an elastic member, and the elastic member is connected to the body assembly and the respective perforating pipe. When the perforating device rolls in a first direction to perform a perforating operation, each elastic member is configured to be connected to the respective perforating pipe in contact with the ground of the lawn and is capable of limiting rotation of the perforating pipe with the body assembly, so that the perforating pipe is inserted into the soil under the lawn at an approximately vertical angle and pulled out of the soil at an approximately vertical angle.

In some embodiments of the present application, under the condition of no external force on the perforating assemblies, an included angle between the extension direction of each perforating pipe and the radial direction of the body assembly is defined as $\alpha$, the radial direction of the body assembly passes through a connection portion of the perforating pipe, and $20° \leq \alpha \leq 30°$.

In some embodiments of the present application, $23° \leq \alpha \leq 26°$.

In some embodiments of the present application, $\alpha$ is equal to $24°$.

In some embodiments of the present application, when the perforating device rolls in a second direction opposite to the first direction, each of the perforating pipes in contact with the ground of the lawn is configured to rotate relative to the body assembly and rotate to a state in which the perforating pipe does not exceed a circumferential surface of the body assembly.

In some embodiments of the present application, each of the elastic members is a tension spring.

In some embodiments of the present application, under the condition of no external force on the perforating assemblies, extension lines of the elastic members coincide with the perforating pipes.

In some embodiments of the present application, each of the perforating pipes comprises a first end portion, a second end portion and a connection portion, the first end portion and the second end portion are respectively located on two sides of the connection portion, the first end portion is connected to the respective elastic member, and the connection portion is rotationally connected to the body assembly.

In some embodiments of the present application, a through hole and an open slot are formed in each of the second end portions, and the through hole is in communication with the open slot in an axial direction of the respective perforating pipe; and under the condition of no external force on the perforating assemblies, in the radial direction of the body assembly, at least parts of the open slots exceed the body assembly.

In some embodiments of the present application, each of the perforating pipes comprises a first side and a second side, the first side and the second side are respectively located on two sides of the perforating pipe in the extension direction, an axis of the body assembly is located on the first side, and the respective open slot faces the first side.

In some embodiments of the present application, each of the limiting members further comprises a limiting pin fixed to the body assembly; each of the elastic members is located on the second side of the respective perforating pipe and is capable of pulling the first end portion of the perforating pipe; and each of the limiting pins is located on the first side of the respective perforating pipe and is capable of abutting against one side of the perforating pipe close to the second end portion.

In some embodiments of the present application, an included angle between the extension direction of each of the perforating pipes and an extension direction of the respective elastic member is defined as $\beta$, and $110° \leq \beta \leq 170°$.

In some embodiments of the present application, each of the perforating pipes comprises a first pipe body and a second pipe body which are connected to each other, an end portion of the first pipe body away from the second pipe body forms the first end portion, and an end portion of the second pipe body away from the first pipe body forms the second end portion.

In some embodiments of the present application, a distance between each of the connection portions and a circumferential surface of the body assembly is 3-7 cm, and/or a distance between each of the connection portions and the respective second end portion is 9-15 cm.

In some embodiments of the present application, further comprising a handle device, the handle device is connected to the body assembly, and the handle device is capable of driving the perforating device to roll.

In some embodiments of the present application, the handle device comprises a handle assembly and a connection assembly which are connected to each other, and the connection assembly is rotationally connected to the body assembly.

In some embodiments of the present application, the handle assembly comprises a plurality of push rods, and the plurality of push rods are movably connected to one another in axial directions thereof.

In some embodiments of the present application, the handle device further comprises a baffle, and the baffle is connected to the connection assembly; and when the perforating device rotates in the first direction to perform the perforating operation, the baffle is capable of blocking the soil carried out by the perforating pipes.

In some embodiments of the present application, the body assembly comprises at least two wheel bodies, the plurality of perforating assemblies are located between the two wheel bodies in axial directions of the wheel bodies, and any one of the perforating assemblies is connected to at least two wheel bodies at the same time; each of the wheel bodies comprises a chamber, a filler is arranged in the chamber, and the filler is any one of water, sand and soil; and a plurality of anti-skid structures are arranged on a circumferential surface of each of the wheel bodies, and the plurality of anti-skid structures are arranged in a circumferential direction of the wheel body In some embodiments of the present application, the anti-skid structures are saw-toothed structures.

In conclusion, the lawn is perforated and aerated by means of the rolling lawn aerator in the present application, the perforating device rolls on the lawn in the first direction, and the perforating pipes make contact with the ground of the lawn, are inserted into the soil at the approximately vertical angle under the action of the limiting members and are pulled out of the soil at the approximately vertical angle after the operation, thereby completing the perforating operation on the lawn, and facilitating growth of plants. In addition, the perforating pipes are inserted into the soil at the approximately vertical angle and are pulled out of the soil at the approximately vertical angle, so that the damage to the lawn can be reduced, meanwhile, the resistance in the process of inserting the perforating pipes into the soil or in the process of pulling the perforating pipes out of the soil can be reduced, and the effect of labor-saving operation can be achieved.

Figure 1:
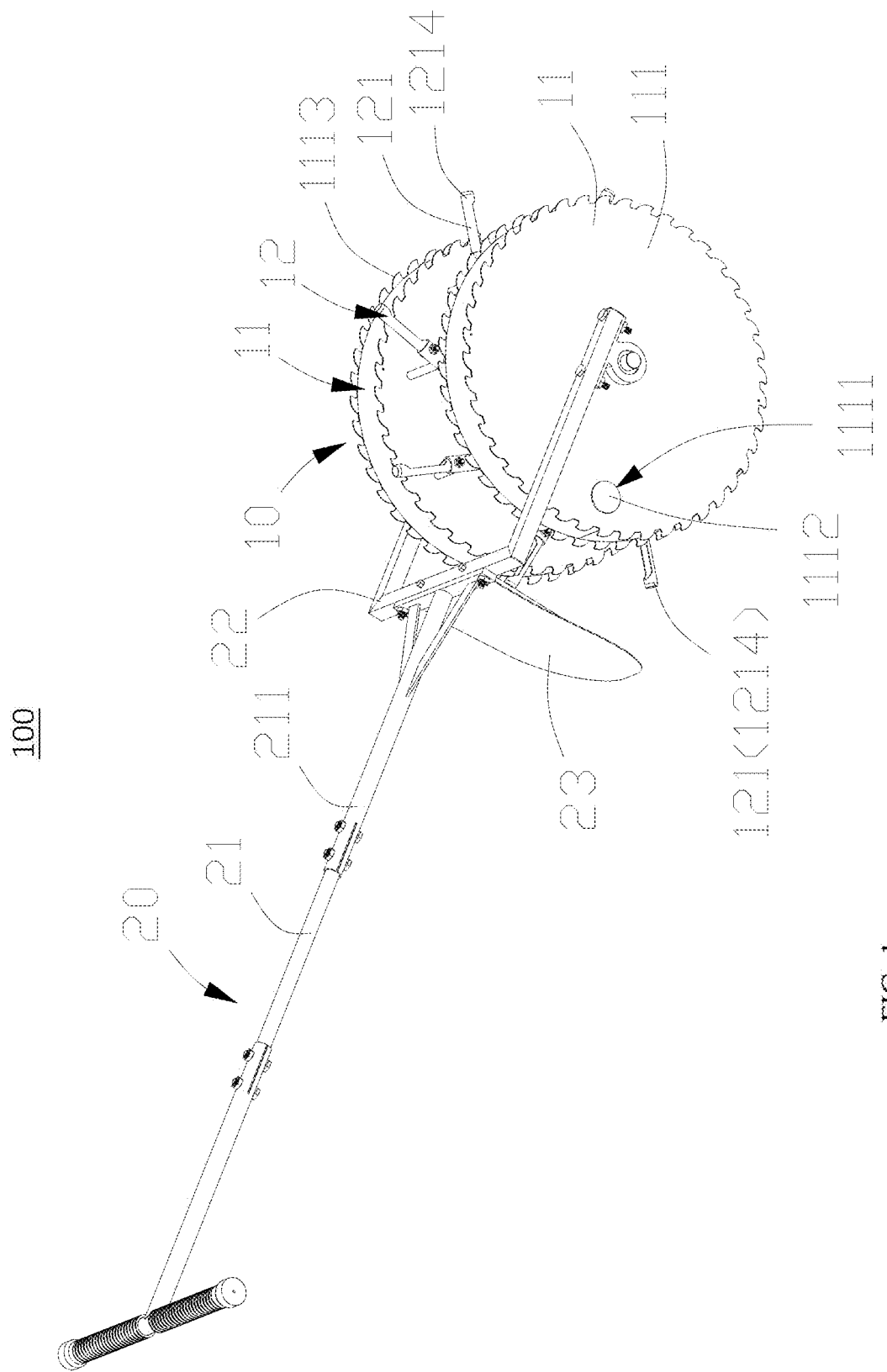
FIG. 1 is a structural schematic diagram of a rolling lawn aerator in an embodiment of the present application.

REFERENCE NUMERALS rolling lawn aerator 100; perforating device 10; handle device 20; ground 200; body assembly 11; wheel body 111; notch portion 1111; sealing member 1112; anti-skid structure 1113;
perforating assembly 12; perforating pipe 121; first side 1211; second side 1212; first end portion 1213; second end portion 1214; connection portion 1215; through hole 1216; open slot 1217; first pipe body 1218; second pipe body 1219; elastic member 122; limiting pin 123; limiting member 124;
handle assembly 21; push rod 211; connection assembly 22; baffle 23; first direction X; and second direction Y.

The present application is further illustrated by the following particular embodiments in conjunction with the above accompanying drawings.

DESCRIPTION OF THE EMBODIMENTS

The technical solutions in embodiments of the present application will be described below in conjunction with the accompanying drawings in the embodiments of the present application. Obviously, the described embodiments are only a part of embodiments of the present application, not all of them.

It should be noted that when one element is deemed to be "connected" to another element, it may be directly connected to another element, or there may be an intermediate element at the same time. When one element is deemed to be "arranged" on another element, it may be directly arranged on another element, or there may be an intermediate element at the same time. In the present application, unless otherwise explicitly specified and limited, the terms "mounting", "connecting", "connection" and "fixing" should be understood in a broad sense, for example, they may be fixed connection, and may also be detachable connection or integrated connection; and they may be direct connection, and may also be indirect connection by means of intermediate media or communication of the interiors of two elements. The specific meanings of the above terms in the present application may be understood by those of ordinary skill in the art according to specific circumstances. The term "and/or" used herein includes any and all combinations of one or more related listed items.

Unless otherwise defined, all technical and scientific terms used herein have the same meanings as those generally understood by those skilled in the art of the present application. The terms used in the specification of the application herein are only for the purpose of describing the particular embodiments and are not intended to limit the present application.

In the description of the embodiments of the present application, the technical terms "first", "second" and the like are only for the purpose of distinguishing different objects, and cannot be understood as indicating or implying the relative importance or implicitly indicating the number, the specific sequence or the priority of the indicated technical features. In the description of the embodiments of the present application, unless otherwise specified, "a plurality of" means two or more.

In the description of the embodiments of the present application, the term "approximately vertical" means that an included angle between two component is in a range of 90+/−15°.

The reference to "embodiments" herein means the specific features, structures or characteristics described in conjunction with the embodiments may be included in at least one embodiment of the present application. The phrase appearing at each position of the specification does not necessarily indicate the same embodiment, and it is not an exclusively independent or alternative embodiment of other embodiments. Various implementation manners in the present application can be combined with one another under the condition that no conflict exists.

It should be noted that the sizes such as thicknesses, lengths and widths of various components in the embodiments of the present application, as shown in the accompanying drawings, and the sizes of the overall thickness, length and width of an integrated device are only for exemplary illustration, and should not constitute any limitation on the present application.

The embodiments of the present application are further illustrated below in conjunction with the accompanying drawings.

Figure 2:
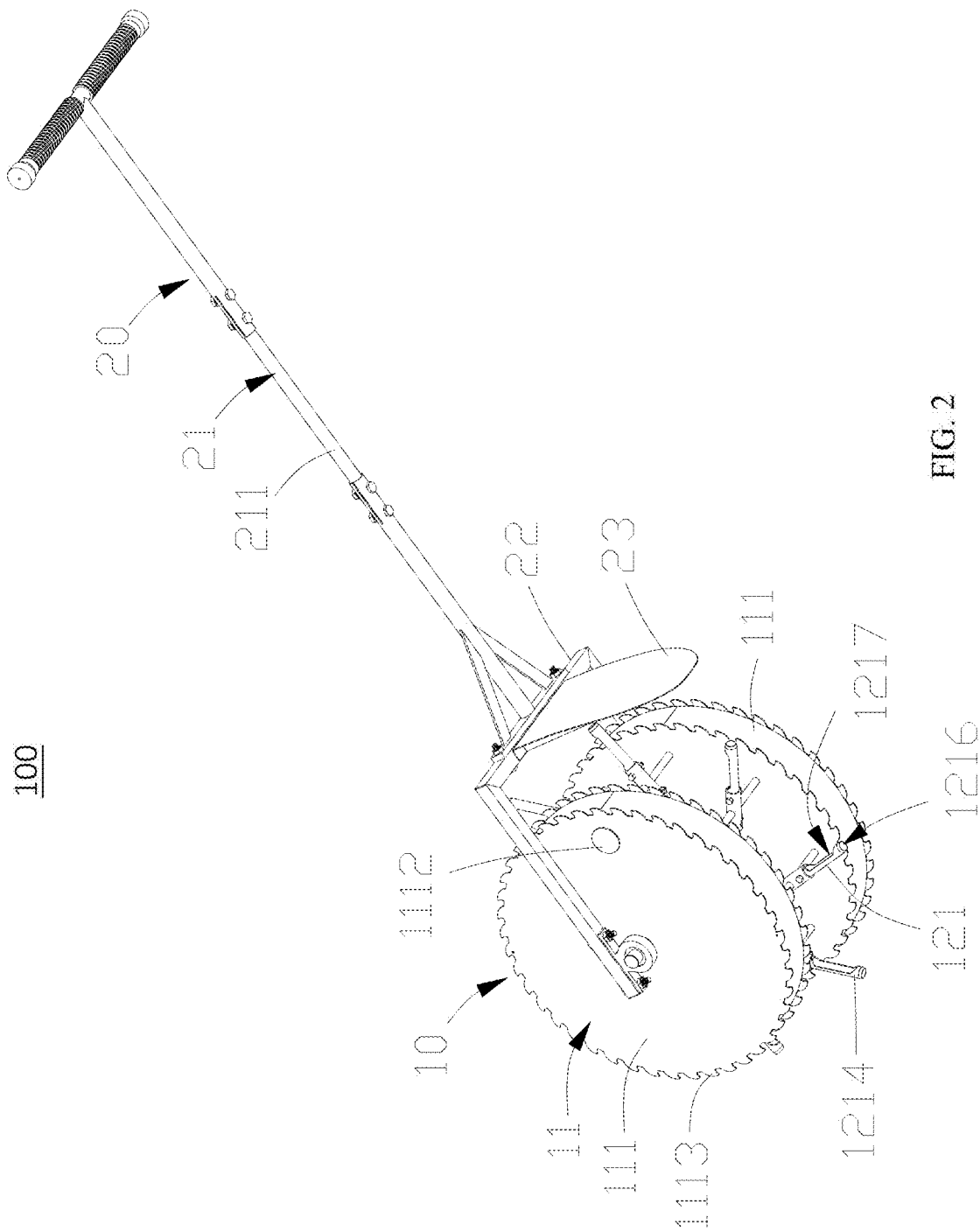
FIG. 2 is a structural schematic diagram of a rolling lawn aerator in an embodiment of the present application.
Figure 3:
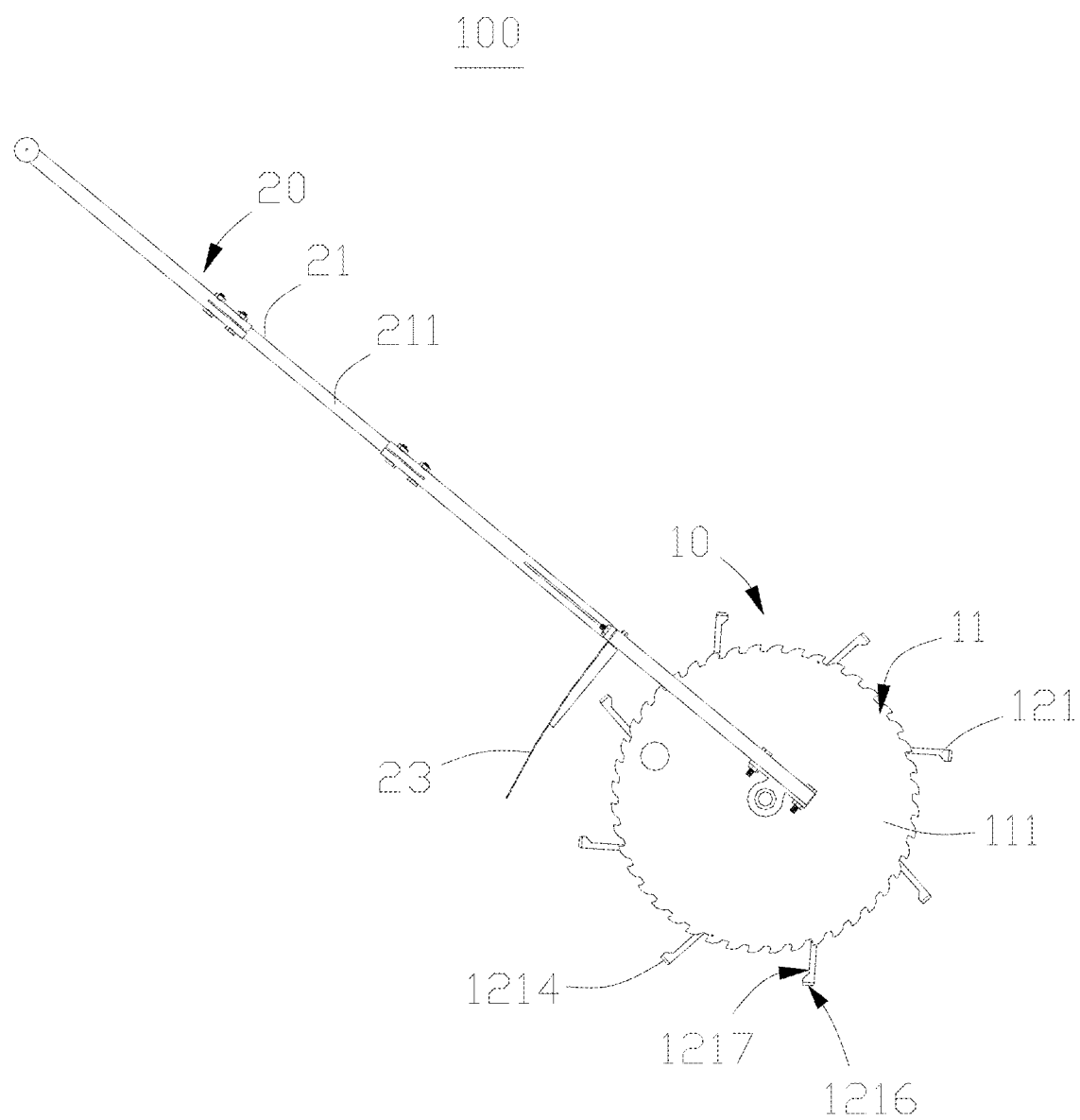
FIG. 3 is a front view of a rolling lawn aerator in an embodiment of the present application.

As shown in FIG. 1 and FIG. 2, an embodiment of the present application provides a rolling lawn aerator 100. The rolling lawn aerator 100 is capable of perforating and aerating a lawn, thereby improving the air permeability of soil and improving the penetrability of air, water and nutrient substances to enable same to reach grass roots more easily. In addition, holes can also help rainwater or irrigation water infiltrate into the soil, thereby reducing water surface losses or water accumulation phenomena. Perforating and aerating of the lawn also have may other benefits which can help growth of the lawn and are not repeated in the present application. It can be understood that the rolling lawn aerator 100 in the present application is capable of perforating and aerating soil under other plants in addition to aerating the lawn.

Exemplary, the rolling lawn aerator 100 rolling on the lawn to perforate and aerate the soil under the lawn is taken as an example below for further explanation.

As shown in FIG. 3 to FIG. 6, in an embodiment, the rolling lawn aerator 100 includes a perforating device 10, where the perforating device 10 includes a body assembly 11 and a plurality of perforating assemblies 12, and the plurality of perforating assemblies 12 are arranged in a circumferential direction of the body assembly 11. Under the condition of no external force on the perforating assemblies 12, at least parts of structures of the perforating assemblies 12 exceed a circumferential surface of the body assembly 11 in a radial direction of the body assembly 11. The condition of no external force on the perforating assemblies 12 means that the perforating assemblies 12 are not affected by structures (for example, ground 200) other than the body assembly 11.

When the perforating device 10 rolls in a first direction X to perform a perforating operation, end portions of the perforating assemblies 12 away from an axis of the body assembly 11 are sequentially inserted into the soil and pulled out of the soil under the action of the gravity of the body assembly 11 and the thrust of an operator, thereby forming a plurality of holes in the soil under the lawn, and the holes are beneficial to growth of the lawn on the basis of the above-mentioned influence of perforating of the soil.

In an embodiment, each perforating assembly 12 includes a perforating pipe 121, and the perforating pipe 121 is rotationally connected to the body assembly 11. Under the condition of no external force on the perforating assemblies 12, in the radial direction of the body assembly 11, at least parts of the perforating pipes 121 exceed the body assembly 11. When the perforating device 10 rolls in the first direction X to perform the perforating operation, a portion of each perforating pipe 121 exceeding the body assembly 11 can be in contact with the ground 200 of the lawn and be inserted into the soil under the lawn at a certain angle, thereby perforating and aerating the soil under the lawn.

In an embodiment, each perforating assembly 12 further includes a limiting member 124, and the limiting member 124 is connected to the body assembly 11. When the perforating device 10 rolls in the first direction X to perform the perforating operation, each limiting member 124 is configured to be connected to the respective perforating pipe 121 in contact with the ground 200 of the lawn and limit rotation of the perforating pipe 121 with the body assembly 11, so that the perforating pipe 121 is inserted into the soil under the lawn at an approximately vertical angle and pulled out of the soil at an approximately vertical angle, the resistance in the process of inserting the perforating pipe 121 into the soil can be reduced, the burden of manual operation can be reduced, and the damage to the lawn can be reduced.

Figure 5:
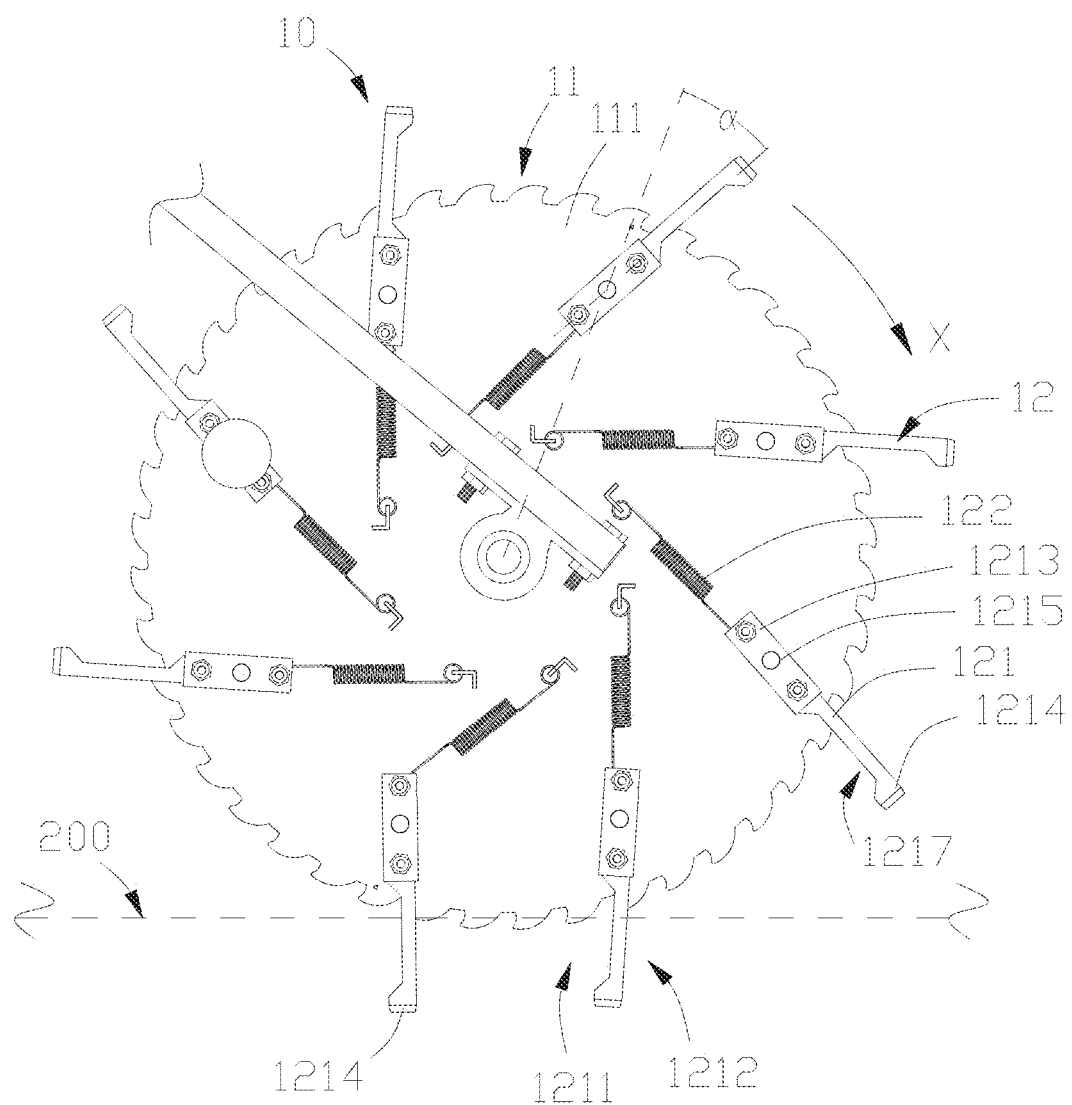
FIG. 5 is a partial structural schematic diagram of a perforating device in a first state in an embodiment of the present application.

In an embodiment, as shown in FIG. 5, under the condition of no external force on the perforating assemblies 12, an included angle between an extension direction of each perforating pipe 121 and the radial direction of the body assembly 11 is defined as α, 20°≤α≤30°, and the radial direction of the body assembly 11 passes through a connection portion 1215 of the perforating pipe 121. When the perforating device 10 rolls in the first direction X to perform the perforating operation, the value of the included angle α is beneficial to inserting of each perforating pipe 121 into the soil under the lawn at a small angle, thereby reducing the resistance in the process of inserting the perforating pipe 121 into the soil, and reducing the damage to the lawn.

In an embodiment, 23°≤α≤26°, so that each perforating pipe 121 can be inserted into the soil under the lawn at a small angle, the resistance in the process of inserting the perforating pipe 121 into the soil can be reduced, the burden of manual operation can be reduced, and the damage to the lawn can be reduced.

In an embodiment, the included angle α is equal to 24°, so that each perforating pipe 121 can be inserted into the soil under the lawn at a small angle, the resistance in the process of inserting the perforating pipe 121 into the soil can be reduced, the burden of manual operation can be reduced, and the damage to the lawn can be reduced.

In an embodiment, the included angle α is equal to any one of 20°, 21°, 22°, 23°, 24°, 25°, 26°, 27°, 28°, 29° and 30°, so that each perforating pipe 121 can be inserted into the soil under the lawn at a small angle, the resistance in the process of inserting the perforating pipe 121 into the soil can be reduced, and the damage to the lawn can be reduced.

In an embodiment, each perforating pipe 121 includes a first side 1211 and a second side 1212, the first side 1211 and the second side 1212 are respectively located on two sides of the perforating pipe 121 in the extension direction, and the axis of the body assembly 11 is located on the first side 1211. When the perforating device 10 rolls in the first direction X to perform the perforating operation, one of the perforating assemblies 12 is taken as an example, when the perforating pipe 121 of the perforating assembly 12 is in contact with the lawn, the second side 1212 is located on a front side of the body assembly 11 in a rolling direction, and the first side 1211 is located on a rear side of the body assembly 11 in the rolling direction. The front side is an advancing direction of the rolling lawn aerator 100.

In an embodiment, when the perforating device 10 rolls in a second direction Y opposite to the first direction X, each perforating pipe 121 in contact with the ground 200 of the lawn can rotate relative to the body assembly 11 and rotate to a state in which the perforating pipe does not exceed the circumferential surface of the body assembly 11 under the action force of the ground.

In an embodiment, operation states of the perforating device 10 include a first state and a second state.

In the first state, the perforating device 10 rolls in the first direction X to perform the perforating operation on the lawn, then the second side 1212 of each perforating pipe 121 inserted into the soil is located on the front side, and the first state is a perforating operation state.

In the second state, the perforating device 10 rolls in the second direction Y, each perforating pipe 121 in contact with the ground 200 of the lawn is not inserted into the soil under the lawn by means of rotation, then for the perforating pipe 121, the first side 1211 is located on a front upper side, and the second state can also be called a transfer state.

In an embodiment, when the perforating device 10 is in the first state, each perforating pipe 121 is configured to be fixedly inserted into the soil relative to the body assembly 11.

In an embodiment, each perforating pipe 121 includes a first end portion 1213, a second end portion 1214 and a connection portion 1215, the first end portion 1213 and the second end portion 1214 are respectively located on two opposite sides of the connection portion 1215, and the perforating pipe 121 is rotationally connected to the body assembly 11 by means of the connection portion 1215. Under the condition of no external force on the perforating assemblies 12, in the radial direction of the body assembly 11, at least parts of structures of the second end portions 1214 exceed the body assembly 11. When the perforating device 10 is in the first state, each second end portion 1214 can perform the perforating operation on the soil under the lawn.

In an embodiment, each limiting member 124 includes an elastic member 122, and the elastic member 122 is connected to the body assembly 11 and the respective first end portion 1213.

In an embodiment, under the condition of no external force on the perforating assemblies 12, each elastic member 122 does not apply an action force on the respective first end portion 1213, and then the included angle between the extension direction of the respective perforating pipe 121 and the radial direction of the body assembly 11 is α.

In an embodiment, under the condition of no external force on the perforating assemblies 12, each elastic member 122 applies a tensile force in an axial direction of the respective perforating pipe 121 to the respective first end portion 1213, the first end portion 1213 of the perforating pipe 121 is pulled by the elastic member 122 to enable the perforating pipe 121 to keep certain tension, and then the included angle between the extension direction of the perforating pipe 121 and the radial direction of the body assembly 11 is α, which is beneficial to inserting of the perforating pipe 121 into the soil.

Figure 6:
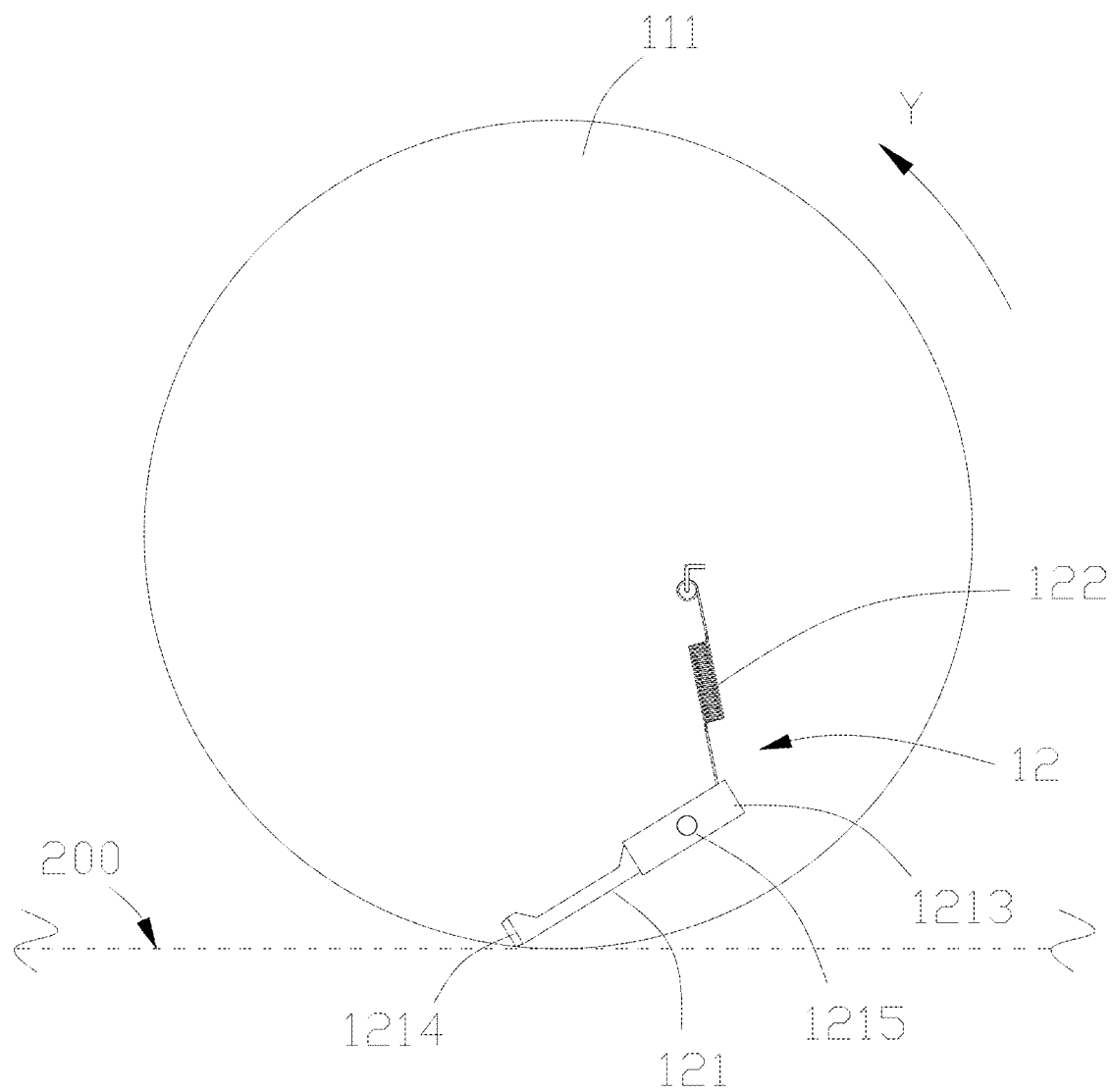
FIG. 6 is a structural schematic diagram of a certain perforating assembly in an embodiment of the present application when a perforating device is in a second state.

In an embodiment, when the perforating device 10 is in the second state, each perforating pipe 121 is configured to rotate relative to the body assembly 11 when being in contact with the ground 200 and to rotate to the state in which the perforating pipe does not exceed the body assembly 11 (as shown in FIG. 6). The state in which the perforating pipe 121 does not exceed the body assembly 11 means that in the radial direction of the body assembly 11, the second end portion 1214 of the perforating pipe 121 does not exceed the circumferential surface of the body assembly 11.

In an embodiment, when the perforating device 10 is in the second state, the perforating device 10 does not perform the perforating operation on the soil under the lawn, and the perforating device 10 can be transferred without other tools, so that the transfer of the perforating device 10 is facilitated, and the influence on the ground 200 during the transfer process can be reduced.

In an embodiment, when the perforating device 10 is in the second state, each perforating pipe 121 in contact with the ground 200 rotates to the state in which the perforating pipe does not exceed the body assembly 11 under the action of the ground 200, then the respective elastic member 122 is elastically deformed, when the action force of the ground 200 on the perforating pipe 121 disappears, an elastic restoring force of the elastic member 122 acts on the respective first end portion 1213 to enable the perforating pipe 121 to restore an initial state, that is, the included angle between the extension direction of the perforating pipe 121 and the radial direction of the body assembly 11 is α, and at least a part of the structure of the second end portion 1214 of the perforating pipe 121 exceeds the body assembly 11.

By means of the above-mentioned embodiments, the perforating operation of the perforating device 10 on the soil is facilitated, the damage to the lawn is reduced, the transfer of the rolling lawn aerator 100 is also facilitated, and the damage to the ground 200 is reduced during the transfer process.

In an embodiment, each elastic member 122 is a tension spring. In other embodiments, each elastic member 122 may also be a torsional spring or a compression spring.

In an embodiment, the perforating pipes 121 are rotationally connected to the body assembly 11 by means of the connection portions 1215, in order to further limit rotation angles of the perforating pipes 121 when performing the perforating operation on the lawn, in this embodiment, under the condition of no external force on the perforating assemblies 12, extension lines of the elastic members 122 coincide with the perforating pipes 121, and the elastic members 122 are the tension springs in this embodiment. In an embodiment, the extension lines of the elastic members 122 coinciding with the perforating pipes 121 may means the extension lines of the elastic members 122 coincide with axes of the perforating pipes 121, and may also means that included angles between the extension lines of the elastic members 122 and the axes of the perforating pipes 121 are +/−5°.

The first end portion 1213 of each perforating pipe 121 is pulled by means of the respective elastic member 122, so that the perforating pipe 121 keeps the certain tension, and the perforating pipe 121 can be effectively inserted into the soil under the lawn at the approximately vertical angle and pulled out of the soil at the approximately vertical angle during the perforating operation.

Figure 4:
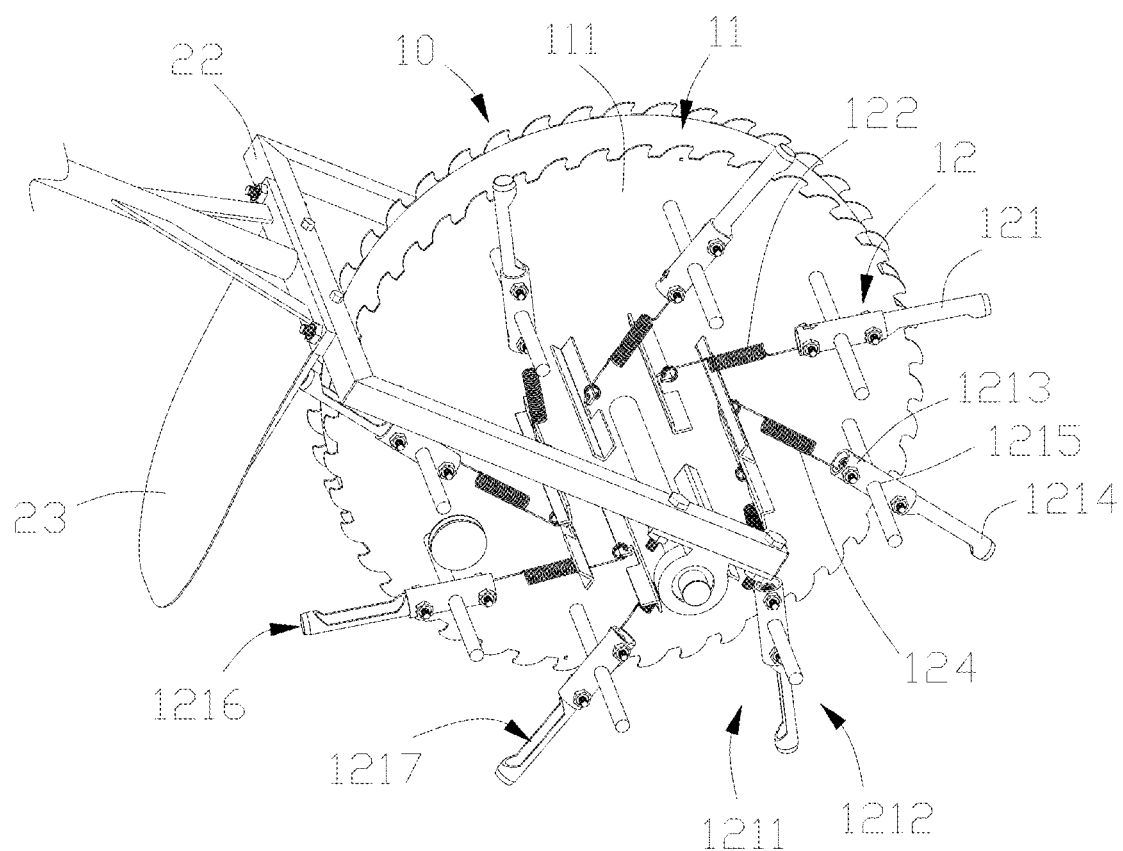
FIG. 4 is a local enlarged view of a part of a structure of a rolling lawn aerator in an embodiment of the present application.
Figure 7:
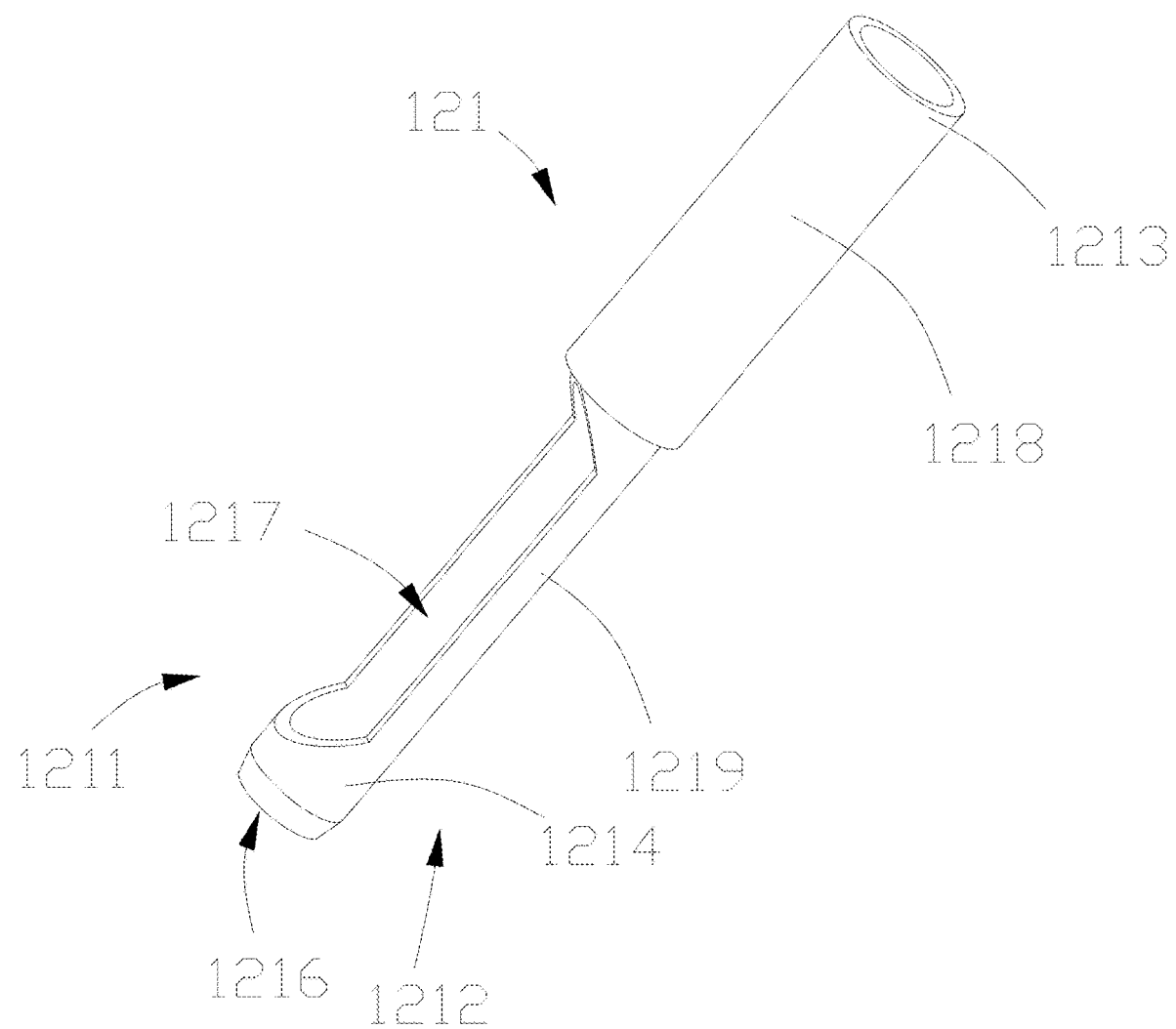
FIG. 7 is a structural schematic diagram of a perforating pipe in an embodiment of the present application.

As shown in FIG. 4, FIG. 5 and FIG. 7, in an embodiment, when the perforating device 10 rolls in the first direction X to perform the perforating operation, for the perforating pipe 121 inserted into the soil, in the process of the perforating device 10 rolling in the first direction X, the body assembly 11 rolls forwards to advance, under the resistance of the soil, the perforating pipe 121 is kept approximately stationary relative to the ground 200 and rolls relative to the body assembly 11, and the elastic member 122 is elastically deformed. The body assembly 11 continues to roll forwards to advance, the connection portion 1215 of the perforating pipe 121 rises, so that the perforating pipe 121 is pulled out of a hole at an angle approximately perpendicular to the ground 200, the resistance of pulling the perforating pipe 121 out of the soil can be reduced, and the damage to the lawn can be reduced.

In an embodiment, when the perforating device 10 rolls in the first direction X to perform the perforating operation, for the perforating pipe 121 inserted into the soil, in the process of the perforating device 10 rolling in the first direction X, the body assembly 11 rolls forwards to advance, under the resistance of the soil, the perforating pipe 121 is kept approximately stationary relative to the ground 200 and rolls relative to the body assembly 11, and the elastic member 122 is elastically deformed. The body assembly 11 continues to roll forwards to advance, the connection portion 1215 of the perforating pipe 121 rises, so that the perforating pipe 121 is pulled out in an original path in which it is inserted into the soil, the resistance of pulling the perforating pipe 121 out of the soil can be reduced, and the damage to the lawn can be reduced.

In an embodiment, a through hole 1216 and an open slot 1217 are formed in an end portion of each second end portion 1214 away from the respective first end portion 1213, and the through hole 1216 is in communication with the open slot 1217 in an axial direction of the respective perforating pipe 121. When each perforating pipe 121 is inserted into the soil, the respective through hole 1216 and the respective open slot 1217 are capable of accommodating a part of the soil, so that the resistance encountered in the process of inserting the perforating pipe 121 into the soil can be reduced, and the perforating pipe 121 can be conveniently inserted into the soil. In addition, each open slot 1217 is capable of discharging the soil inserted into the respective through hole 1216, so that the respective perforating assembly 12 achieves the effect of turning the soil, and the risk that the through hole 1216 is blocked by the soil can be reduced.

In an embodiment, each open slot 1217 faces the respective first side 1211, so that the soil can be conveniently brought out, thereby achieving the effect of turning the soil.

In an embodiment, each perforating pipe 121 includes a first pipe body 1218 and a second pipe body 1219 which are connected to each other, an end portion of the first pipe body 1218 away from the second pipe body 1219 forms the first end portion 1213, and an end portion of the second pipe body 1219 away from the first pipe body 1218 forms the second end portion 1214.

In this embodiment, the perforating pipe 121 is divided into two components, and the first pipe body 1218 and the second pipe body 1219 are detachably connected, so that the structural strength and durability can be enhanced; the first pipe body 1218 and the second pipe body 1219 can be made of different materials or materials of different thicknesses according to usage scenes, thereby optimizing the overall strength and durability of the perforating pipe 121; meanwhile, structures of the first pipe body 1218 and the second pipe body 1219 can also be designed into different diameters or shapes, so that the frictional resistance in the perforating process is minimized so as to improve the perforating efficiency; and gaps capable of facilitating discharging of the soil and grass cuttings can also be provided, thereby reducing blockage, and improving the working efficiency.

Further, the first pipe body 1218 and the second pipe body 1219 are detachably connected, so that a damaged portion is convenient to replace, the overall replacement cost is reduced, the maintenance time is shortened, under different working conditions, it is possible to replace a specific portion only instead of replacing the entire perforating pipe 121, and the economy and flexibility are improved; for example, after the second pipe body 1219 is worn due to long-time operation, the second pipe body 1219 can be replaced by means of the detachable design, or the second pipe bodies 1219 in different models can be replaced according to different geological conditions, thereby achieving the more efficient perforating operation.

Further, the perforating pipe 121 is divided into the two components, so that the machining and manufacturing technology of the perforating pipe 121 can also be simplified, the manufacturing cost of the perforating pipe 121 can be saved, and the manufacturing efficiency of the perforating pipe 121 can be improved. In this embodiment, the first pipe body 1218 and the second pipe body 1219 are detachably connected by means of a bolt.

In an embodiment, each connection portion 1215 is located on the respective first pipe body 1218, and the first pipe body 1218 is rotationally connected to the body assembly 11, so that the respective perforating pipe 121 is rotationally connected to the body assembly 11.

In an embodiment, each connection portion 1215 is located on the respective second pipe body 1219, and the second pipe body 1219 is rotationally connected to the body assembly 11, so that the respective perforating pipe 121 is rotationally connected to the body assembly 11.

In an embodiment, connected regions of each first pipe body 1218 and the respective second pipe body 1219 form the connection portion 1215.

In an embodiment, each first pipe body 1218 is coaxially fixedly connected to the respective second pipe body 1219.

In an embodiment, each first pipe body 1218 is made of a metal material, which can improve the structural strength and rigidity of the first pipe body 1218, reduce the risk of deformation and damage of the first pipe body 1218, and prolong the service life thereof.

In an embodiment, the first pipe body 1218 is formed by means of machining of a metal pipe or is integrally formed by means of casting, which can simplify the machining and manufacturing technology thereof, improve the manufacturing efficiency of the first pipe body 1218, and save the manufacturing cost. In an embodiment, the first pipe body 1218 may also be prepared by means of machining.

In an embodiment, each second pipe body 1219 is made of a metal material, which can improve the structural strength and rigidity of the second pipe body 1219, reduce the risk of deformation and damage of the second pipe body 1219, and prolong the service life thereof.

In an embodiment, the second pipe body 1219 is formed by means of machining of a metal pipe or is integrally formed by means of casting, which can simplify the machining and manufacturing technology thereof, improve the manufacturing efficiency of the second pipe body 1219, and save the manufacturing cost. In an embodiment, the second pipe body 1219 may also be prepared by means of machining.

In an embodiment, each first pipe body 1218 is detachably connected to the respective second pipe body 1219 by means of assembly, thereby facilitating maintenance. In an embodiment, each first pipe body 1218 and the respective second pipe body 1219 can also form the integrally formed perforating pipe 121 by means of welding, which can improve the structural strength and rigidity of the perforating pipe 121, reduce the risk of deformation and damage of the perforating pipe 121, and prolong the service life thereof.

In other embodiments, each first pipe body 1218 and the respective second pipe body 1219 may also be in bent shapes (not shown).

Figure 8:
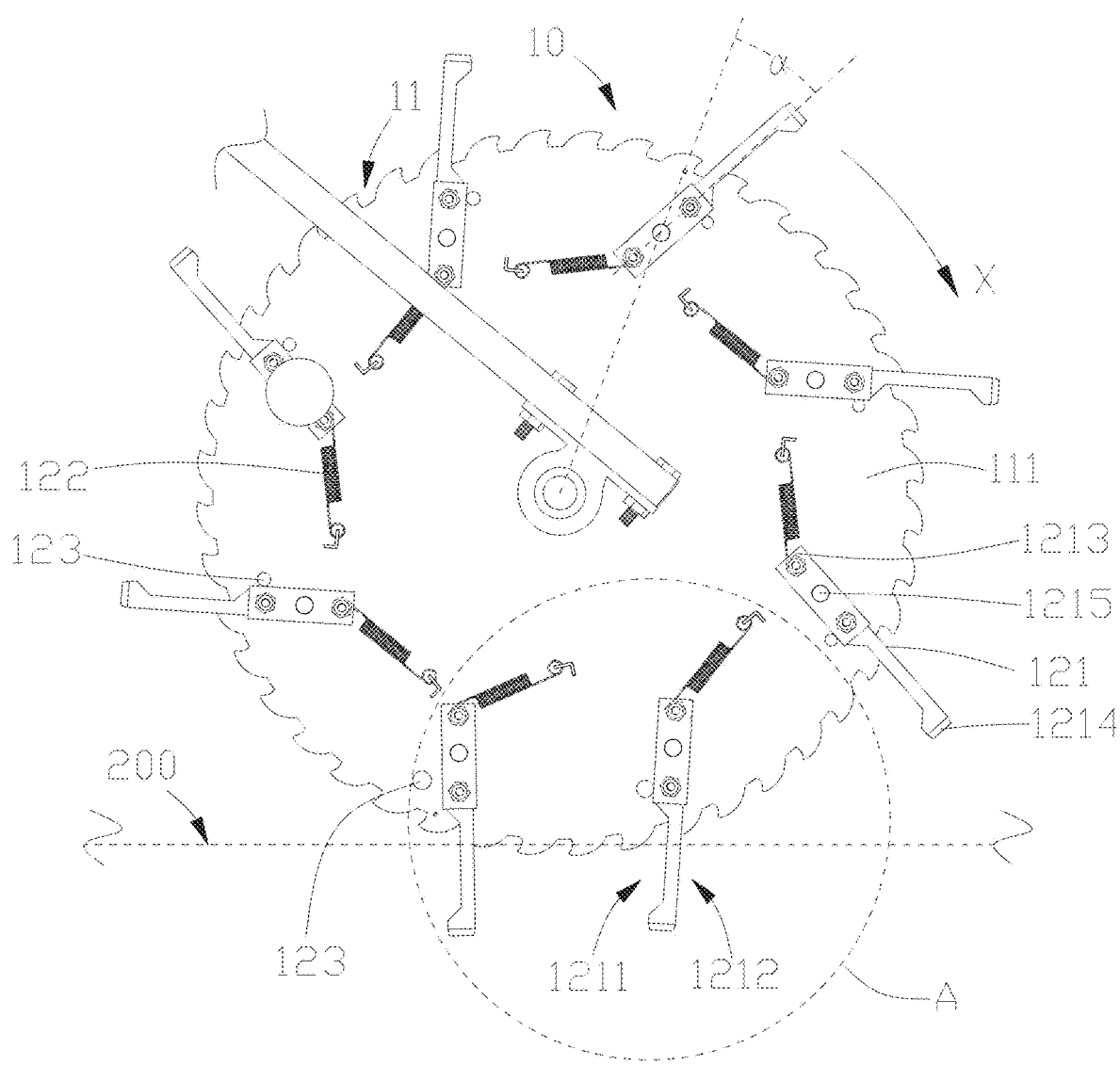
FIG. 8 is a partial structural schematic diagram of a perforating device in an embodiment of the present application.
Figure 9:
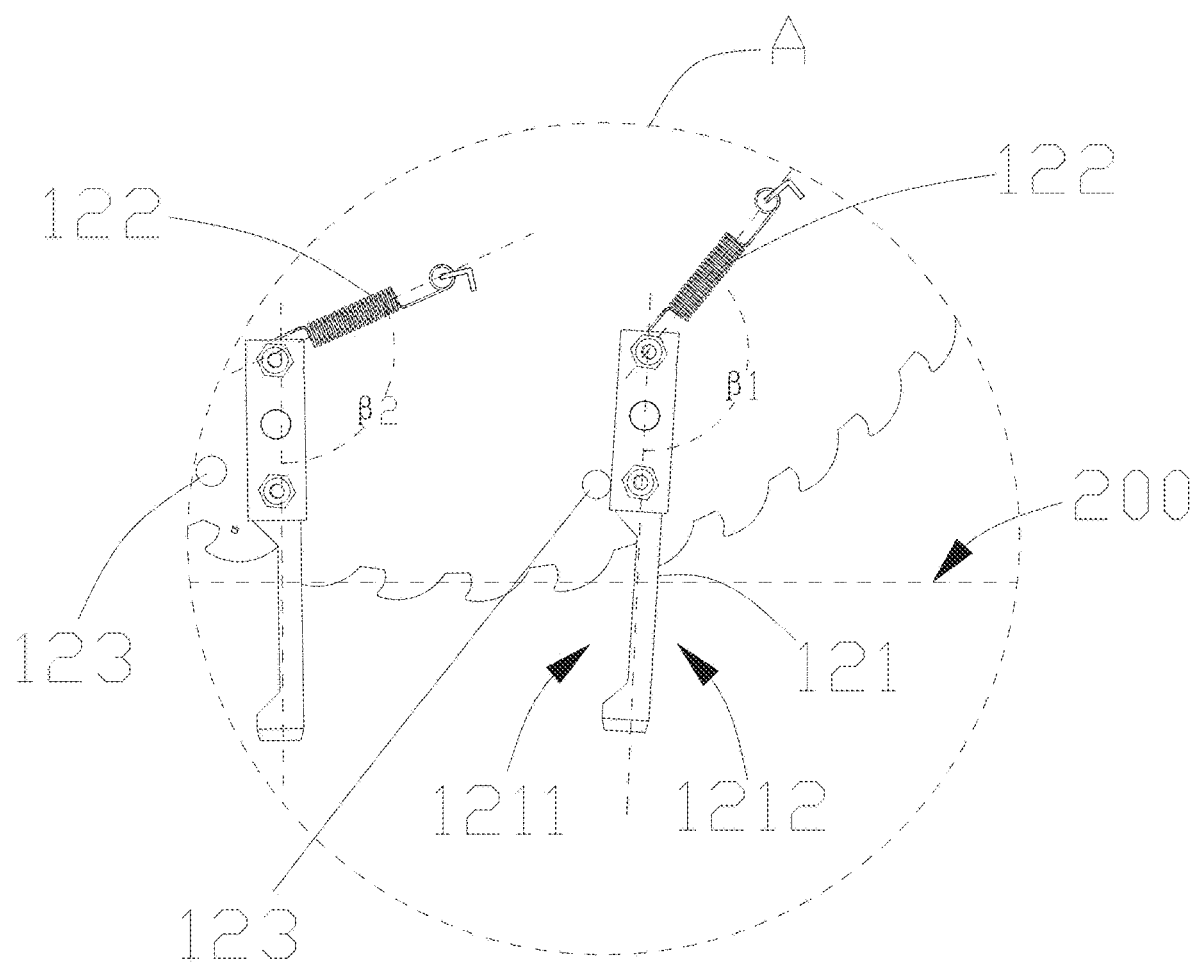
FIG. 9 is an enlarged view at A in FIG. 8.

As shown in FIG. 8 and FIG. 9, in an embodiment, each limiting member 124 further includes a limiting pin 123 fixed to the body assembly 11, and the limiting pin 123 is located on the first side 1211 of the respective perforating pipe 121, is capable of abutting against one side of the perforating pipe 121 close to the second end portion 1214, and is configured to limit the rotation of the perforating pipe 121 relative to the body assembly 11.

Further, each elastic member 122 is located on the second side 1212 of the respective perforating pipe 121 and is capable of pulling the first end portion 1213 of the perforating pipe 121.

In this embodiment, the first end portion 1213 of each perforating pipe 121 is pulled by means of the respective elastic member 122 located on the second side 1212 of the perforating pipe 121, so that the perforating pipe 121 keeps the certain tension, and it is ensured that the perforating pipe 121 can be effectively inserted into the soil under the lawn at the approximately vertical angle and pulled out of the soil at the approximately vertical angle during the perforating operation.

In an embodiment, as shown in FIG. 8, under the condition of no external force on the perforating assemblies 12, the included angle between the extension direction of each perforating pipe 121 and the radial direction of the body assembly 11 is defined as $\alpha$, $20° \leq \alpha \leq 30°$, and the radial direction of the body assembly 11 passes through the connection portion 1215 of the perforating pipe 121. When the perforating device 10 rolls in the first direction X to perform the perforating operation, the value of the included angle $\alpha$ is beneficial to inserting of each perforating pipe 121 into the soil under the lawn at a small angle, thereby reducing the resistance in the process of inserting the perforating pipe 121 into the soil, and reducing the damage to the lawn. Under the condition of no external force on the perforating assemblies 12, each perforating pipe 121 is connected to the respective limiting pin 123, and the respective elastic member 122 cooperates with the limiting pin 123 to limit the perforating pipe 121, so that the included angle $\alpha$ is formed between the extension direction of the perforating pipe 121 and the radial direction of the body assembly 11.

In an embodiment, $23° \leq \alpha \leq 26°$, so that each perforating pipe 121 can be inserted into the soil under the lawn at a small angle, the resistance in the process of inserting the perforating pipe 121 into the soil can be reduced, the burden of manual operation can be reduced, and the damage to the lawn can be reduced.

In an embodiment, the included angle $\alpha$ is equal to 24°, so that each perforating pipe 121 can be inserted into the soil under the lawn at a small angle, the resistance in the process of inserting the perforating pipe 121 into the soil can be reduced, the burden of manual operation can be reduced, and the damage to the lawn can be reduced.

In an embodiment, the included angle $\alpha$ is equal to any one of 20°, 21°, 22°, 23°, 24°, 25°, 26°, 27°, 28°, 29° and 30°, so that each perforating pipe 121 can be inserted into the soil under the lawn at a small angle, the resistance in the process of inserting the perforating pipe 121 into the soil can be reduced, and the damage to the lawn can be reduced.

As shown in FIG. 8 and FIG. 9, in the first state, that is, the perforating operation state, the perforating device 10 rolls in the first direction X to perform the perforating operation on the lawn, then the second side 1212 of each perforating pipe 121 to be inserted into the soil is located on the front side, under the cooperation action of the elastic member 122 and the limiting pin 123, an included angle between the perforating pipe 121 to be inserted into the soil and the elastic member 122 is $\beta1$, under the condition of no external force on the perforating pipe 121, $110° \leq \beta1 \leq 170°$, and the perforating pipe 121 can be inserted into the soil under the lawn at the approximately vertical angle.

In an embodiment, $120° \leq \beta1 \leq 160°$. In this embodiment, $\beta1$ may be any one of 120°, 130°, 140°, 150° and 160°.

After each perforating pipe 121 is inserted into the soil at the approximately vertical angle, since the perforating pipe 121 is rotationally connected to the body assembly 11 by means of the respective connection portion 1215, under the action of the respective elastic member 122, the perforating pipe 121 keeps the certain tension, then the body assembly 11 continues to rotate forwards, the perforating pipe 121 keeps being inserted into the soil, rotates relative to the body assembly 11 and rises relative to the ground 200, then an included angle between the perforating pipe 121 to be pulled out of the soil and the elastic member is $\beta2$, and $\beta2$ is smaller than $\beta1$; the body assembly 11 rotates and drives the respective connection portion 1215 to rotate, and the connection portion 1215 rotates to drive the perforating pipe 121 to move in a vertical direction, so that the perforating pipe 121 is pulled out of the soil at the approximately vertical angle; and the path in which the perforating pipe 121 is pulled out of the soil is similar to the path in which the perforating pipe 121 is inserted into the soil, so that the damage to the lawn can be reduced, meanwhile, the resistance in the process of inserting the perforating pipe into the soil or in the process of pulling the perforating pipe out of the soil can be reduced, and the effect of labor-saving operation can be achieved.

In an embodiment, a distance between each connection portion 1215 and the circumferential surface of the body assembly 11 is in a range of 3-7 cm, which can ensure that the respective perforating pipe 121 has a sufficient support force when being inserted into the lawn, thereby avoiding the influence on the perforating effect due to inclination or instability of the perforating device 10 due to an excessively long or excessively short distance; meanwhile, by means of the distance, a junction of the perforating pipe 121 and the body assembly 11 can transfer the force effectively, thereby ensuring the best mechanical property in the perforating process. The distance in this range is beneficial to effective distribution of the weight of the body assembly 11 to the perforating pipes 121 in the perforating process, thereby improving the perforating effect.

In a further particular embodiment, the distance between each connection portion 1215 and the circumferential surface of the body assembly 11 is 5 cm.

In an embodiment, a distance between each connection portion 1215 and the respective second end portion 1214 is in a range of 9-15 cm; during the perforating operation, each perforating pipe 121 needs to bear the large pressure and impact, setting the distance between the respective connection portion 1215 and an outer end portion of the perforating pipe 121 in the range of 9-15 cm can make force transfer more uniform, thereby avoiding stress concentration, and reducing the risk of deformation or damage of the perforating pipe 121.

Further, the range (9-15 cm) of the distance between each connection portion 1215 and the respective second end portion 1214 can improve the stability of the respective perforating pipe 121. The excessively short distance may cause shaking or instability of each perforating pipe 121 during operation, and the excessively long distance may increase the risk of bending of the perforating pipe 121 and the risk of damage to the lawn due to the fact that the perforating pipe 121 cannot be pulled out of the soil timely in an approximately vertical direction. The range (9-15 cm) of the distance between each connection portion 1215 and the respective second end portion 1214 can reduce the risk of stressed deformation of the respective perforating pipe 121 while ensuring the stability thereof, and protects the lawn at the same time.

Further, the range of the distance between each connection portion 1215 and the respective second end portion 1214 also considers the operation convenience and efficiency. During actual operation, the appropriate distance can ensure that the operator can easily control and operate the rolling lawn aerator 100 when using it, thereby improving the working efficiency.

In a further particular embodiment, the distance between each connection portion 1215 and the respective second end portion 1214 is no less than 9 cm. As shown in FIG. 1 and FIG. 2, in an embodiment, the body assembly 11 includes at least two wheel bodies 111, all the wheel bodies 111 are arranged at intervals in an axial direction thereof, and the plurality of perforating assemblies 12 are located between two wheel bodies 111 in the axial direction of the wheel bodies 111. The wheel bodies 111 can play a role in protecting the perforating assemblies 12, thereby reducing the risk of damage to the perforating assemblies 12 due to collisions. In addition, the plurality of wheel bodies 111 are arranged, and the perforating device 10 is located between two wheel bodies 111, so that the stability of the perforating device 10 in the rolling process can be improved, and the risk of side turning-over of the perforating device 10 can be reduced.

In an embodiment, the body assembly 11 may include two wheel bodies 111, and may also include three, four or more wheel bodies 111.

Exemplary, the body assembly 11 including two wheel bodies 111 is taken as an example below for further illustration.

In an embodiment, each perforating assembly 12 is connected to the two wheel bodies 111 at the same time, which can improve the overall structural strength of the perforating device 10, and reduce the risk of deformation or damage to the perforating device 10.

In an embodiment, the two wheel bodies 111 have the same overall sizes and are coaxially fixedly connected, thereby facilitating rolling of the perforating device 10 on the ground 200.

In an embodiment, each wheel body 111 includes a chamber, the chamber is capable of accommodating a filler, so as to increase the weight of the body assembly 11, thereby increasing the frictional force and grip of rolling of the body assembly 11 on the ground 200, and facilitating rolling of the perforating device 10 on the ground 200. In an embodiment, the filler is any one of water, sand and soil.

In an embodiment, each wheel body 111 is provided with a notch portion 1111, the notch portion 1111 is in communication with the respective chamber, and the filler can be injected into the chamber by means of the notch portion 1111, or the filler in the chamber can be moved out of the notch portion 1111, thereby facilitating maintenance of the body assembly 11.

In an embodiment, each wheel body 111 further includes a sealing member 1112, the sealing member 1112 is detachably connected to the respective notch portion 1111, and the sealing member 1112 is capable of sealing the notch portion 1111, thereby reducing the risk of leakage of the filler in the respective chamber. In an embodiment, each sealing member 1112 is a rubber plug.

In an embodiment, a plurality of anti-skid structures 1113 are arranged on a circumferential surface of each wheel body 111, and the plurality of anti-skid structures 1113 are arranged in a circumferential direction of the wheel body 111. The anti-skid structures 1113 are arranged, so that the frictional force and grip with the ground 200 when the wheel bodies 111 roll on the ground 200 can be increased, thereby facilitating rolling of the perforating device 10 on the ground 200.

In an embodiment, the anti-skid structures 1113 are saw-toothed structures. In an embodiment, the anti-skid structures 1113 are concave-convex structures.

In an embodiment, each wheel body 111 is made of a metal material, which can improve the structural strength and rigidity of the wheel body 111, reduce the risk of deformation and damage of the wheel body 111, and prolong the service life thereof.

In an embodiment, the rolling lawn aerator 100 further includes a handle device 20, the handle device 20 is connected to the body assembly 11, and the handle device 20 is capable of driving the perforating device 10 to roll, so that a user can operate the rolling lawn aerator 100 to perform the perforating operation or transfer the rolling lawn aerator 100.

In an embodiment, the handle device 20 is capable of being connected to the two wheel bodies 111, thereby improving the stability of rolling of the perforating device 10 by means of the handle device 20.

In an embodiment, the handle device 20 can be pushed to push the rolling lawn aerator 100 to advance. In addition, the handle device 20 can also be pulled to pull the rolling lawn aerator 100 to advance, so that the user can push or pull the rolling lawn aerator 100 according to different conditions, thereby improving the experience of the user.

In an embodiment, the handle device 20 is rotationally connected to the wheel bodies 111, when the perforating device 10 needs to perform the perforating operation on the lawn in the first direction X, the handle device 20 can be rotated to the front side of the perforating device 10, and the perforating device 10 is driven by pulling to roll in the first direction X. In addition, the handle device 20 can also be rotated to the rear side of the perforating device 10, and the perforating device 10 is driven by pushing to roll in the first direction X. Thus, the user can push or pull the rolling lawn aerator 100 according to different conditions, thereby improving the experience of the user.

In addition, the handle device 20 rotates relative to the wheel bodies 111, so that the height of the handle device 20 away from an end portion of the perforating device 10 can also be adjusted, thereby facilitating users of different heights to push or pull the handle device 20, and improving the experience of the user.

In an embodiment, the user can push the rolling lawn aerator 100 to advance by means of the handle device 20, and can also rotate the handle device 20 to pull the handle device 20 to pull the rolling lawn aerator 100 to advance, thereby providing multiple operation manners for the user, and improving the experience of the user.

In an embodiment, the handle device 20 includes a handle assembly 21 and a connection assembly 22 which are connected to each other, and the connection assembly 22 is rotationally connected to the body assembly 11. The handle assembly 21 is T-shaped, thereby facilitating the user to move the perforating device 10 by means of the handle assembly 21, and facilitating the user to apply an action force to the handle assembly 21.

In an embodiment, the handle assembly 21 includes a plurality of push rods 211, and the plurality of push rods 211 are movably connected to one another in axial directions thereof. By adjusting the connection states of the different push rods 211, the length of the handle assembly 21 can be adjusted, thereby facilitating the users of different heights to operate the rolling lawn aerator 100, and improving the experience of the users of different heights.

In an embodiment, every two adjacent push rods 211 are sleeved with each other, so that the plurality of push rods 211 constitute a telescopic assembly, thereby facilitating adjustment of the length of the handle assembly 21, and reducing the operation difficulty of the user.

In an embodiment, when the user is tall, the different push rods 211 can be adjusted from a sleeved contracted state to an extended state, thereby lengthening the handle assembly 21, and facilitating the user to drive the perforating device 10 to roll by means of the handle device 20.

In an embodiment, the plurality of push rods 211 are sleeved with each other and are in the contracted state, so that the handle assembly 21 can be shortened, operation by the short user is facilitated, and the handle device 20 is also convenient to store.

In an embodiment, the handle device 20 further includes a baffle 23, and the baffle 23 is connected to the connection assembly 22. When the handle device 20 drives the perforating device 10 to rotate to perforate the lawn, the baffle 23 is capable of blocking the soil brought out by the open slots 1217, thereby reducing the risk of splashing of the soil to the body of the user.

In an embodiment, the handle device 20 is detachably connected to the perforating device 10, and the rolling lawn aerator 100 is convenient to transport and store by disconnecting the handle device 20 from the perforating device 10.

In an embodiment, the body assembly 11 is detachably connected to the perforating assemblies 12, and the rolling lawn aerator 100 is convenient to transport and store by disconnecting the body assembly 11 from the perforating assemblies 12.

The above embodiments are only the particular embodiments of the present application, but the scope of protection of the present application is not limited to these embodiments. Any modification or replacement within the scope of technologies disclosed in the present application should be included in the scope of disclosure of the present application.

What is claimed is:

1. A rolling lawn aerator, comprising a perforating device, wherein the perforating device is capable of rolling on a lawn so as to perforate and aerate soil under the lawn;
the perforating device comprises a body assembly and a plurality of perforating assemblies, and the plurality of perforating assemblies are arranged in a circumferential direction of the body assembly;
each of the perforating assemblies comprises:
a perforating pipe, wherein the perforating pipe is rotationally connected to the body assembly, and under the condition of no external force, an extension direction of the perforating pipe does not coincide with a radial direction of the body assembly; and
a limiting member, wherein the limiting member comprises an elastic member, and the elastic member is connected to the body assembly and the perforating pipe; and
when the perforating device rolls in a first direction to perform a perforating operation, each of the elastic members is configured to be connected to the respective perforating pipe in contact with the ground of the lawn and is capable of limiting rotation of the perforating pipe with the body assembly, so that the perforating pipe is inserted into the soil under the lawn at an approximately vertical angle and pulled out of the soil at an approximately vertical angle; and
wherein each of the perforating pipes comprises a first end portion, a second end portion and a connection portion, the first end portion and the second end portion are respectively located on two sides of the connection portion, the first end portion is connected to the respective elastic member, and the connection portion is rotationally connected to the body assembly.

2. The rolling lawn aerator according to claim 1, wherein under the condition of no external force on the perforating assemblies, an included angle between the extension direction of each of the perforating pipes and the radial direction of the body assembly is defined as $\alpha$, the radial direction of the body assembly passes through a connection portion of the perforating pipe, and and $20°\leq\alpha\leq30°$.

3. The rolling lawn aerator according to claim 2, wherein $23°\leq\alpha\leq26°$.

4. The rolling lawn aerator according to claim 3, wherein $\alpha$ is equal to $24°$.

5. The rolling lawn aerator according to claim 1, wherein when the perforating device rolls in a second direction opposite to the first direction, each of the perforating pipes in contact with the ground of the lawn is configured to rotate relative to the body assembly and rotate to a state in which the perforating pipe does not exceed a circumferential surface of the body assembly.

6. The rolling lawn aerator according to claim 1, wherein each of the elastic members is a tension spring.

7. The rolling lawn aerator according to claim 1, wherein under the condition of no external force on the perforating assemblies, extension lines of the elastic members coincide with the perforating pipes.

8. The rolling lawn aerator according to claim 1, wherein
a through hole and an open slot are formed in each of the second end portions, and the through hole is in communication with the open slot in an axial direction of the respective perforating pipe; and
under the condition of no external force on the perforating assemblies, in the radial direction of the body assembly, at least parts of the open slots exceed the body assembly.

9. The rolling lawn aerator according to claim 8, wherein each of the perforating pipes comprises a first side and a second side, the first side and the second side are respectively located on two sides of the perforating pipe in the extension direction, an axis of the body assembly is located on the first side, and the respective open slot faces the first side.

10. The rolling lawn aerator according to claim 9, wherein each of the limiting members further comprises a limiting pin fixed to the body assembly;
each of the elastic members is located on the second side of the respective perforating pipe and is capable of pulling the first end portion of the perforating pipe; and
each of the limiting pins is located on the first side of the respective perforating pipe and is capable of abutting against one side of the perforating pipe close to the second end portion.

11. The rolling lawn aerator according to claim 10, wherein an included angle between the extension direction of each of the perforating pipes and an extension direction of the respective elastic member is defined as $\beta$, and $110°\leq\beta\leq170°$.

12. The rolling lawn aerator according to claim 9, wherein each of the perforating pipes comprises a first pipe body and a second pipe body which are connected to each other, an end portion of the first pipe body away from the second pipe body forms the first end portion, and an end portion of the second pipe body away from the first pipe body forms the second end portion.

13. The rolling lawn aerator according to claim 12, wherein a distance between each of the connection portions and a circumferential surface of the body assembly is 3-7 cm, and/or a distance between each of the connection portions and the respective second end portion is 9-15 cm.

14. The rolling lawn aerator according to claim 1, further comprising a handle device, wherein the handle device is connected to the body assembly, and the handle device is capable of driving the perforating device to roll.

15. The rolling lawn aerator according to claim 14, wherein the handle device comprises a handle assembly and a connection assembly which are connected to each other, and the connection assembly is rotationally connected to the body assembly.

16. The rolling lawn aerator according to claim 15, wherein the handle assembly comprises a plurality of push rods, and the plurality of push rods are movably connected to one another in axial directions thereof.

17. The rolling lawn aerator according to claim 15, wherein the handle device further comprises a baffle, and the baffle is connected to the connection assembly; and when the perforating device rotates in the first direction to perform the perforating operation, the baffle is capable of blocking the soil carried out by the perforating pipes.

18. The rolling lawn aerator according to claim 1, wherein the body assembly comprises at least two wheel bodies, the plurality of perforating assemblies are located between the two wheel bodies in axial directions of the wheel bodies, and any one of the perforating assemblies is connected to at least two wheel bodies at the same time;

each of the wheel bodies comprises a chamber, a filler is arranged in the chamber, and the filler is any one of water, sand and soil; and a plurality of anti-skid structures are arranged on a circumferential surface of each of the wheel bodies, and the plurality of anti-skid structures are arranged in a circumferential direction of the wheel body.

19. The rolling lawn aerator according to claim 18, wherein the anti-skid structures are saw-toothed structures.

\* \* \* \* \*